United States Patent [19]
Crisler et al.

[11] Patent Number: 5,477,550
[45] Date of Patent: Dec. 19, 1995

[54] METHOD FOR COMMUNICATING DATA USING A MODIFIED SR-ARQ PROTOCOL

[76] Inventors: Kenneth J. Crisler, 2116 Kentucky Ct., Wheaton, Ill. 60187; Michael L. Needham, 354 W. Hellen Rd., Palatine, Ill. 60067; Timothy J. Wilson, 931 Canterbury Dr., Schaumburg, Ill. 60195

[21] Appl. No.: 28,902

[22] Filed: Mar. 8, 1993

[51] Int. Cl.⁶ .................................................. H04L 1/16
[52] U.S. Cl. ................................................................ 371/32
[58] Field of Search ............................. 371/32, 33, 34, 371/35

[56] References Cited

U.S. PATENT DOCUMENTS

| | | | |
|---|---|---|---|
| 4,422,171 | 12/1983 | Wortley et al. | 371/32 |
| 4,584,685 | 4/1986 | Gajjar | 371/35 |
| 5,084,877 | 1/1992 | Netravali et al. | 371/32 |

OTHER PUBLICATIONS

Calo, S. et al.; "A Broadcast Protocol for File Transfers to Multiple Sites", *IEEE Trans. on Communications*, vol. COM-29, No. 11, Nov. 1981, pp. 1701–1707.

*Primary Examiner*—Stephen M. Baker
*Attorney, Agent, or Firm*—Christopher P. Moreno

[57] ABSTRACT

Within a transmitter (101), a quantity of data (201) to be transmitted is parsed into variable length, uniquely identified messages (202), which are in turn parsed into fixed-length, uniquely identified blocks (207–211). Messages are buffered and then transmitted to a receiver (103). Upon reception of a message-received communication by the transmitter (101) corresponding to a particular buffered message, that particular message is unbuffered. Upon reception of a message-partially-received communication by the transmitter (101) corresponding to a particular buffered message, those blocks corresponding to portions of the particular buffered message that were not adequately received (703) are retransmitted.

22 Claims, 2 Drawing Sheets

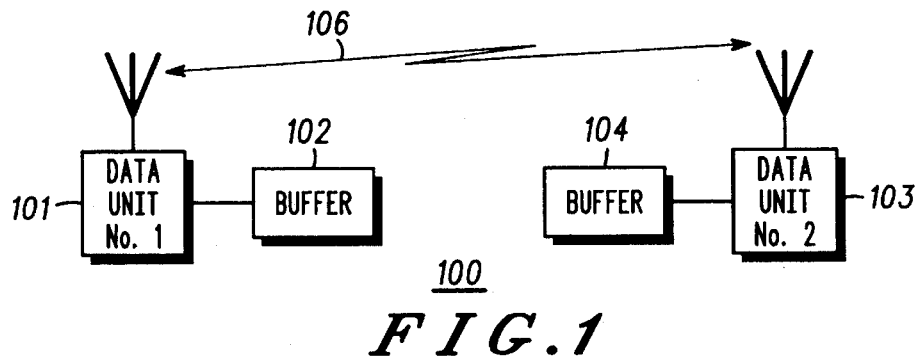
FIG.1
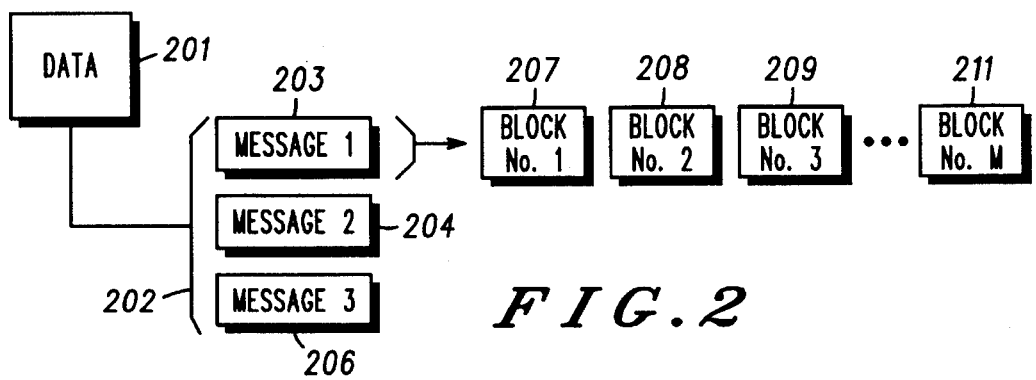
FIG.2
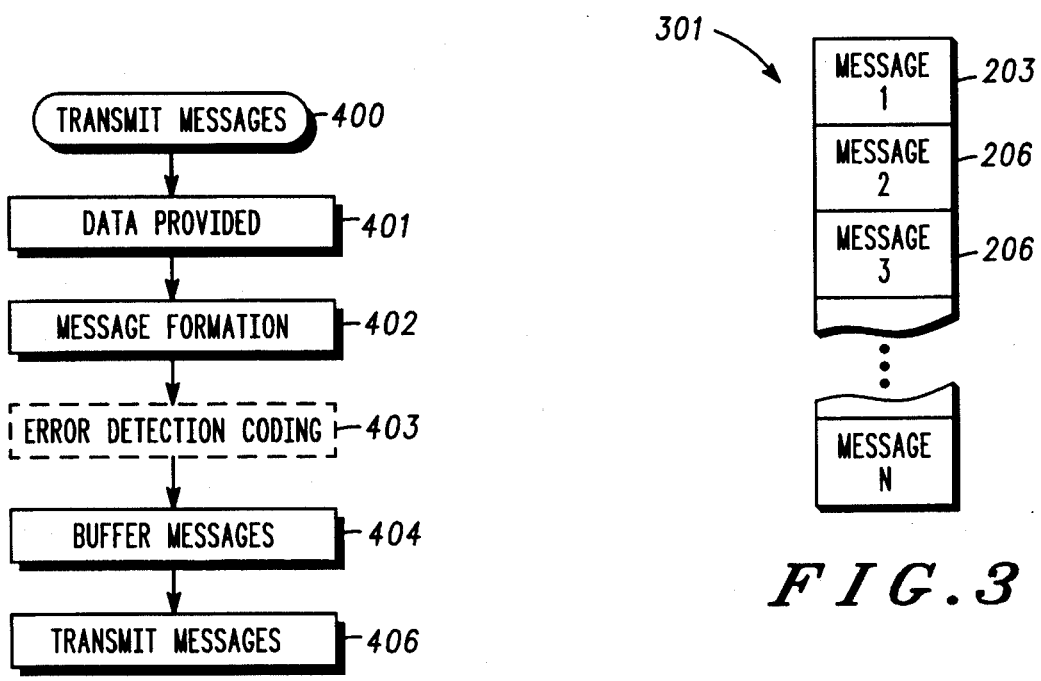
FIG.4
FIG.3

METHOD FOR COMMUNICATING DATA USING A MODIFIED SR-ARQ PROTOCOL

FIELD OF THE INVENTION

The present invention relates generally to communication systems, and in particular, to a method of communicating data.

BACKGROUND OF THE INVENTION

Communication systems are known to comprise a plurality of communication units, such as in-car mobiles or in-hand portables and repeaters transmitting and receiving information via a limited number of radio frequency (RF) communication resources (channels). The integrity of data communicated via RF channels is typically affected by noise, which has the effect of inducing errors in the data being communicated. To achieve reliable data transfers, some type of error-control protocol is needed. Quite often, an automatic repeat-request (ARQ) protocol is used in which error detection coding performed on sets of data, known as packets, allows a receiver to detect the occurrence of errors and, in the event of correctable errors or no errors, to send an acknowledgement (ACK) of correct reception back to the transmitter, or, in the event of uncorrectable errors, send back a non-acknowledgement (NACK) indicating the packet contained errors.

The form of ARQ most commonly used with RF data communication systems is "stop-and-wait" ARQ (SW-ARQ) in which the transmitting unit sends a data packet and then waits for an ACK before sending the next packet. Uncorrectable channel errors to the packet result in either a NACK or a "time-out" (i.e. a time interval where no feedback is received), in which case the transmitting unit re-sends the packet. In any ARQ-type protocol, it is desirable from a receiver's point of view for packets to be sent only in sequential order. This method has the advantage of being simple and of ensuring that the correct order of data messages (packets) is maintained. However, the substantial delay in the feedback path of many RF data communication systems results in a very poor channel throughput rate, as the channel is idle during the wait for the ACK.

To overcome this limitation of the SW-ARQ protocol, a "sliding window" protocol can be used. These protocols are distinguished by the existence of a memory buffer in the transmitter, called a window, capable of storing multiple data packets. Thus, the transmitter can continue sending new packets while waiting for the old packets to be ACK'd, thereby preventing the idle channel condition. If a NACK is returned for a packet, or if a time-out occurs, the packet is retrieved from the memory buffer and re-sent. As the oldest pending packets are ACK'd, they are dropped from the memory buffer; in essence, the window "slides" past them, making room for new packets to be transmitted.

The use of the sliding window on the transmit side will result in some packets reaching the receive side out of order, due to retransmissions. To maintain correct ordering of the packets, a sequence number is typically assigned to each packet by the transmitter. The receive side must then ensure that the received packets are passed to the upper protocol layers in the correct sequence. One method of handling this is for the receiver not to accept any packets out of sequence. If an out of sequence packet is received, it is NACK'd, and all subsequently received packets are ignored until the rejected packet is received correctly. The transmitter, upon receiving the NACK, retransmits the rejected packet, as well as the subsequent (N-1) packets that were ignored by the receiver (N being the window size). This scheme, termed "Go-Back-N" ARQ (GBN-ARQ), has the advantage of requiring no memory buffer space on the receive side, but the disadvantage of wasting channel space by retransmitting all (N-1) packets after a NACK'd packet.

This disadvantage may be overcome by creating a memory storage buffer on the receive side, so that the packets that are received after a NACK'd packet may be stored. Upon receiving the NACK, the transmitter then re-sends only the one incorrect packet. When this packet is correctly received, the receiver passes it on to the upper protocol layers, along with all subsequent correctly received packets in storage. In this way, correct sequencing is maintained. Since only incorrectly received packets are retransmitted on the channel, this scheme, termed "Selective Repeat" ARQ (SRARQ), is much more efficient then GBN-ARQ, but requires substantial memory buffer space on the receive side.

In spite of the advantages presented by SR-ARQ, it is seldom used in RF data communication systems. One reason is that, due to the high error rate over the RF channel (as a result of, for example, Rayleigh fading, co-channel interference, and the like), packets are efficient only if small packet sizes are used, since a single uncorrected bit error necessitates the retransmission of the entire packet. With the SR-ARQ protocol, one would therefore need large windows, to accommodate many small pending packets rather than a few large ones, on each side to make the protocol efficient. This, in turn, would require a large range of sequence numbers. The conflicting requirements of small packets and large sequence numbers means a substantial bit overhead in each packet. Also, the resulting large number of required ACKs and NACKs on the return channel would take up significant channel capacity. Large window sizes also increase the complexity of the protocol control on the transmit side, as individual timers are needed for each window location to determine time-out conditions on each packet.

Therefore, a need exists for an ARQ-based protocol, offering the advantages of sliding window and selective-repeat protocols, that allows the reliable and efficient transmission of data over high error-rate communication channels.

BRIEF DESCRIPTION OF THE DRAWINGS

FIG. 1 illustrates a data communication system in accordance with the present invention.

FIG. 2 illustrates a method of parsing data to be transmitted in accordance with the present invention.

FIG. 3 illustrates a method of organizing data messages within a transmit storage buffer.

FIG. 4 illustrates a flow chart which may be used in a transmitter to implement the present invention.

DESCRIPTION OF A PREFERRED EMBODIMENT

Figure 5:
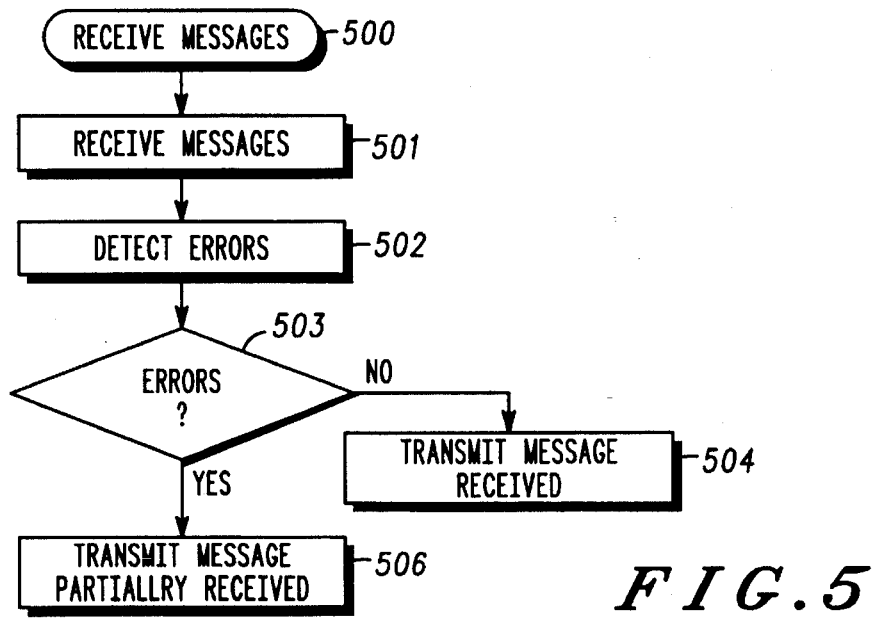
FIG. 5 illustrates a flow chart which may be used in a receiver to implement the present invention.

The present invention provides a reliable and efficient buffered (sliding window) SR-ARQ protocol through the use of a hierarchical data structure. Packets of data (messages) to be sent over an RF channel are broken up into a number of smaller fixed-length blocks. Each block in a message is given its own error detection field, enabling a receiver to tell if an individual block was received with or without error. Furthermore, each block is given a block sequence number stating its position in a message, and each message as a whole is given a message sequence number to determine its position in the buffer. When a message is sent over the RF channel, the receiver decodes each block separately to see if it was in error. After the entire message is received, the receiver constructs an ACK message that includes the message sequence number along with an indication showing which of the blocks in the message were correctly received, as identified by their respective block sequence numbers. The transmitter then responds by re-sending an abbreviated version of the message containing only those blocks not received correctly. If a message ACK shows that all relevant blocks were received correctly, no retransmission is needed.

The present invention can be more fully described with reference to FIGS. 1–7. FIG. 1 illustrates a data communication system (100) comprised of data units (101, 103), storage buffers (102, 104), and a wireless communication resource (106). The storage buffers (102, 104) serve to temporarily store data being transmitted and received between the data units (101, 103). The data units (101,103) may comprise Motorola KDT-840 data terminals or similar programmable platforms. The wireless communication resource (106) may comprise an RF channel. For purposes of explanation, only the flow of data from data unit 1 (101) to data unit 2 (103) will be considered throughout the remainder of this description. It is understood that the present invention equally applies to cases in which data flows in both directions.

FIG. 2 illustrates a method of parsing data to be transmitted from data unit 1 (101) to data unit 2 (103). A quantity of data (201), which may be, for example, a data file of arbitrary length, is provided for transmission. The quantity of data (201) is automatically parsed into a plurality of messages (202) by the transmitting data unit (101). In the context of the present invention, it is important to note that the term "message" hereafter refers to packets of data parsed from a larger data entity. The messages (203, 204, 206) may be of variable length, but no longer than a predetermined maximum length.

Each message in turn is automatically parsed into a number of fixed-length blocks. The number of blocks comprising each message is dependant upon the length of each message. In a preferred embodiment, the fixed-length block is substantially shorter than the predetermined maximum length of the message. For example, a block length of 10 bytes and a predetermined maximum message length of 1500 bytes can be used. Furthermore, the blocks within a message are assigned sequential identification numbers. In the current example, message 1 (203) is parsed into M blocks (207, 208, 209, 211), sequentially identified as 1 through M. It is important to note that the present invention does not preclude other methods of parsing the quantity of data (201) into messages and their associated blocks. For example, the quantity of data (201) may also be first parsed into blocks from which messages of varying length could be constructed without loss of applicability to the present invention.

FIG. 3 illustrates a transmit storage buffer (301) in which the data messages (203, 204, 206) are stored, pending transmission. The transmit storage buffer (301) constitutes at least a portion of the storage buffer (102) associated with data unit 1 (101). In a preferred embodiment, the transmit storage buffer (301) is capable of storing a predetermined plurality of messages with each message assigned a sequential identification number. As one example, a maximum of up to eight messages may be stored in the transmit storage buffer (301), sequentially identified as 1 through 8, pending transmission. Note that a similar buffer exists in the receiving data unit to temporarily store each message that it receives.

FIG. 4 illustrates a flowchart (400) describing the procedure for the transmission of messages by a data unit. In particular, the provided data (401) is parsed into messages (402) and their associated blocks as described above. Error detection coding is then optionally applied to each individual block (403) of each of the messages which allows the receiving data unit to determine which blocks in each of the messages have been adequately received. In a preferred embodiment, adequately received blocks are those blocks in which no errors are detected based on the error detection coding. A copy of each of the messages is then put into the storage buffer (404), and each of the messages is transmitted over the communication channel (406).

FIG. 5 illustrates a flowchart (500) describing the procedure for the reception of messages by a data unit. After the messages are received (501), the error detection coding related to each block in each of the messages is checked (502), to determine which blocks have been adequately received. If no error detection coding has been applied, other error detection mechanisms could of course be used, as well understood in the art. For each of the messages in which no errors are detected (503), a message-received communication is transmitted (504) via the communication channel to the data unit that initiated the transmission. In a preferred embodiment, the message-received communication includes the particular received message's identification number. Conversely, for each of the messages in which errors are detected within one or more blocks (503), a message-partially-received communication is transmitted (506). In a preferred embodiment, the message-partially-received communication includes the particular received message's identification number, as well as the block identification number or numbers pertaining to those blocks that were determined to have been received inadequately during the error detection phase (503). The message-received and message-partially-received communications are collectively termed transmission acknowledgments.

Figure 6:
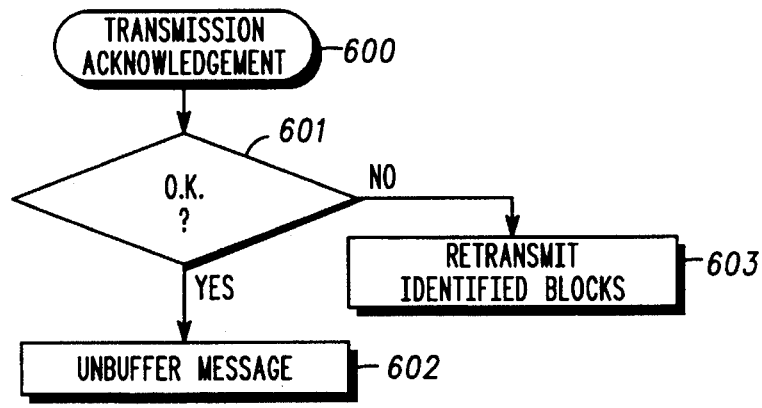
FIG. 6 illustrates an additional flow chart which may be used in a transmitter to implement the present invention.

FIG. 6 illustrates a flowchart (600) describing the procedure for the reception of a transmission acknowledgment by a data unit that has previously initiated a transmission. If the received transmission acknowledgment is a message-received communication corresponding to a particular buffered message, as identified by its message identification number, that particular message is unbuffered (602). Conversely, if the received transmission acknowledgment is a message-partially-received communication corresponding to a particular buffered message, a retransmission is performed (603), consisting of some or all of those blocks corresponding to those portions of the particular buffered message that were not adequately received, as identified by their block identification numbers. In a preferred embodiment, only those blocks that were not adequately received are contained in the retransmission. In an alternate embodiment, at least one of those blocks that was adequately received may be retransmitted as well.

In a similar manner, if the received transmission acknowledgment is a message-received communication corresponding to particular retransmitted blocks (i.e. blocks for which the transmitter has already done at least one retransmission), the corresponding buffered message which includes the particular retransmitted blocks is unbuffered (602). If the received transmission acknowledgment is a message-partially-received communication corresponding to particular retransmitted blocks, a retransmission is performed (603), consisting of at least some of those blocks that correspond to those portions of the particular retransmitted blocks that were not adequately received.

Figure 7:
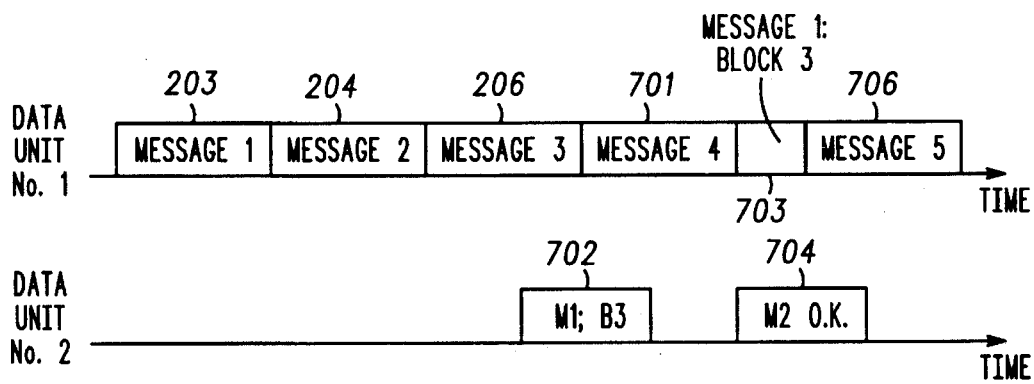
FIG. 7 illustrates an example sequence of transmitted data communications between two data units in accordance with the present invention.

FIG. 7 illustrates an example sequence of transmitted data communications between two data units. Message 1 (203) in the transmit storage buffer (301) of data unit 1 (101) is transmitted via the wireless communication resource (106) to data unit 2 (103). This is followed immediately by message 2 (204), which can be sent without waiting for the transmission acknowledgment corresponding to message 1 (203). Message 3 (206) and message 4 (701), by now added to the messages stored in the transmit storage buffer (301), follow in a similar manner. During these transmissions, a transmission acknowledgment (702) corresponding to message 1 (203) is sent from data unit 2 (103) back to data unit 1 (101). In this example, the transmission acknowledgment (702) is a message-partially-received communication, indicating specifically that block 3 (209) of message 1 (203) was not received adequately. Upon receipt of this message-partially-received communication, data unit 1 (101) sends a retransmission (703) containing only block 3 (209) of message 1 (203). Since message 1 (203) has not yet been fully acknowledged, it remains in the transmit storage buffer (301). After the retransmission (703), message 5 (706), by now added to the messages stored in the transmit storage buffer (301), is transmitted. During this time, a second transmission acknowledgment (704) from data unit 2 (103) is transmitted. In this example, the second transmission acknowledgment (704) is a message-received communication corresponding to message 2 (204). Upon receipt of this transmission acknowledgment, data unit 1 (101) unbuffers message 2 (204) from the transmit storage buffer (301). This process continues for all messages stored in the transmit storage buffer (301) associated with data unit 1 (101).

By creating a hierarchical structure of variable length messages composed of fixed-length blocks, the present invention allows for efficient and reliable transfer of data from one data unit to another over a wireless communication resource. There are multiple advantages as a result of this data structure. By creating large messages composed of many smaller blocks, the number of uniquely identified messages currently residing in the transmit storage buffer (window) is reduced. Accordingly, the overhead required to keep track of messages pending acknowledgement within the window is also reduced. Also, fewer message transmission acknowledgements are required on the return channel. The application of error correction coding to each uniquely identified block within a message allows only those blocks received with errors to be retransmitted, as opposed to entire messages, thus improving the channel throughput efficiency.

We claim:

1. A method comprising the steps of:

A) providing data robe transmitted;

B) automatically parsing the data into messages and fixed-length blocks, which messages are comprised of the blocks and which messages are no longer than a predetermined length;

C) buffering the messages pending transmission;

D) transmitting the messages;

E) upon receipt of a message-received communication as corresponds to a particular buffered message, unbuffering the particular buffered message;

F) upon receipt of a message-partially-received communication as corresponds to a particular buffered message, retransmitting:

i) at least some blocks that correspond to portions of the particular buffered message that were not adequately received;

ii) but none of those blocks that correspond to portions of the particular buffered message that were adequately received.

2. The method of claim 1, wherein step D comprises the step of transmitting the messages via a wireless communication resource.

3. The method of claim 8, wherein the fixed length blocks are substantially shorter than the predetermined length.

4. The method of claim 1, wherein the message-partially-received communication includes identification information of the particular buffered message and of the blocks that correspond to the portions of the particular buffered message that were not adequately received, and wherein such identification information is used to identify the blocks to be retransmitted.

5. The method of claim 1, and further including the steps of:

G) upon receipt of a message-received communication as corresponds to particular retransmitted blocks, unbuffering the particular buffered message that includes such particular retransmitted blocks;

H) upon receipt of a message-partially-received communication as corresponds to particular retransmitted blocks, retransmitting:

i) at least some blocks that were retransmitted but that were not adequately received.

6. The method of claim 1, wherein step C comprises buffering a predetermined plurality of messages.

7. The method of claim 6, wherein the predetermined plurality of messages is 8.

8. A method comprising the steps of:

A) providing data to be transmitted;

B) automatically parsing the data into messages and fixed-length blocks, which messages are comprised of the blocks and which messages are no longer than a predetermined length;

C) buffering the messages pending transmission;

D) transmitting the messages;

E) upon receipt of a message-received communication as corresponds to a particular buffered message, unbuffering the particular buffered message;

F) upon receipt of a message-partially-received communication as corresponds to a particular buffered message, retransmitting i) at least some of those blocks that correspond to portions of the particular buffered message that were not adequately received;

ii) at least one but not all of those blocks that correspond to portions of the particular buffered message that were adequately received.

9. The method of claim 8, wherein step D comprises the step of transmitting the messages via a wireless communication resource.

10. The method of claim 8, wherein the fixed length blocks are substantially shorter than the predetermined length.

11. The method of claim 8, wherein the message-partially-received communication includes identification information of the particular buffered message and of the blocks that correspond to the portions of the particular buffered message that were not adequately received, and wherein such identification information is used to identify the blocks to be retransmitted.

12. The method of claim 8, and further including the steps of:
G) upon receipt of a message-received communication as corresponds to particular retransmitted blocks, unbuffering the particular buffered message that includes such particular retransmitted blocks;
H) upon receipt of a message-partially-received communication as corresponds to particular retransmitted blocks, retransmitting:
i) at least some blocks that were retransmitted but that were not adequately received.

13. The method of claim 8, wherein step C comprises buffering a predetermined plurality of messages.

14. The method of claim 13, wherein the predetermined plurality of messages is 8.

15. A method comprising the steps of:
at a first data unit:
A) providing data to be transmitted;
B) automatically parsing the data into messages and fixed-length blocks, which messages are comprised of the blocks and which messages are no longer than a predetermined length;
C) error detection coding the blocks to provide error detection coded messages;
D) buffering the error detection coded messages pending transmission;
E) transmitting the error detection coded messages; at a second data unit:
F) receiving the error detection coded messages to provide received messages;
G) processing the error detection coded messages to detect the presence of errors in any blocks that comprise the received messages;
H) when no errors at detected, transmitting a message-received communication;
I) when errors are detected in at least one block, transmitting a message-partially-received communication; at the first data unit:
J) upon receipt of a message-received communication as corresponds to a particular buffered message, unbuffering the particular buffered message;
K) upon receipt of a message-partially-received communication as corresponds to a particular buffered message, retransmitting: i) at least some blocks that correspond to portions of the particular buffered message that were not adequately received;
ii) but none of those blocks that correspond to portions of the particular buffered message that were adequately received.

16. The method of claim 15, wherein step E comprises the step of transmitting the error detection coded messages via a wireless communication resource.

17. The method of claim 15, wherein the fixed length blocks are substantially shorter than the predetermined length.

18. The method of claim 15, wherein the message-partially-received communication includes identification information of the particular buffered error detection coded message and of the blocks that correspond to the portions of the particular buffered error detection coded message that were not adequately received, and wherein such identification information is used to identify the blocks to be retransmitted.

19. The method of claim 15, and further including the steps of:
L) upon receipt of a message-received communication as corresponds to particular retransmitted blocks, unbuffering the particular buffered error detection coded message that includes such particular retransmitted blocks;
M) upon receipt of a message-partially-received communication as corresponds to particular retransmitted blocks, retransmitting:
i) at least some blocks that were retransmitted but that were not adequately received.

20. The method of claim 15, wherein step D comprises buffering a predetermined plurality of error detection coded messages.

21. The method of claim 20, wherein the predetermined plurality of error detection coded messages is 8.

22. A method for reliably communicating data from a first data unit to a second data unit using a wireless communication resource, comprising the steps of:
A) providing data to be transmitted;
B) automatically parsing the data into messages and fixed-length blocks, which messages are comprised of the blocks and which messages are no longer than a predetermined length, such that messages of substantially different lengths will be comprised of different numbers of blocks;
C) error detection coding the blocks to provide error detection coded messages;
D) buffering the error detection coded messages pending transmission;
E) transmitting the error detection coded messages to the second data unit using the wireless communication resource;
F) upon receipt of a message-received communication from the second data unit as corresponds to a particular buffered error detection coded message, unbuffering the particular buffered error detection coded message, thereby establishing capacity to allow buffering of another message;
G) upon receipt of a message-partially-received communication from the second data unit as corresponds to a particular buffered error detection coded message, retransmitting:
i) at least some blocks that correspond to portions of the particular buffered error detection coded message that were not adequately received;
ii) but none of those blocks that correspond to portions of the particular buffered error detection coded message that were adequately received.

* * * * *